United States Patent [19]

Lin

[11] Patent Number: 5,604,481
[45] Date of Patent: Feb. 18, 1997

[54] TIRE PRESSURE DETECTOR

[75] Inventor: Ming-Te Lin, Tainan, Taiwan

[73] Assignee: Bai CHJ Industrial Co., Ltd., Tainan, Taiwan

[21] Appl. No.: 400,839

[22] Filed: Mar. 8, 1995

[51] Int. Cl.$^6$ .................................................. B60C 23/00
[52] U.S. Cl. ...................... 340/442; 340/443; 73/146.3; 73/146.8; 200/61.22; 116/34 R
[58] Field of Search ..................... 340/442, 443, 340/445; 73/146.3, 146.4, 146.5, 146.8; 200/61.22, 61.25, 61.26; 116/34 R

[56] References Cited

U.S. PATENT DOCUMENTS

| | | | |
|---|---|---|---|
| 4,737,760 | 4/1988 | Huang et al. | 340/445 |
| 4,814,745 | 3/1989 | Wang | 340/442 |
| 4,945,337 | 7/1990 | Huang | 340/442 |
| 5,025,244 | 6/1991 | Huang | 340/442 |
| 5,491,465 | 2/1996 | Adams | 340/442 |
| 5,513,524 | 5/1996 | Rosenfeld | 340/442 |

*Primary Examiner*—Jeffery Hofsass
*Assistant Examiner*—Edward Lefkowitz
*Attorney, Agent, or Firm*—Reinhart, Boerner, Van Deuren, Norris & Rieselbach, sc

[57] ABSTRACT

A tire pressure detector includes a casing that receives a battery unit and a signal generating unit therein and that is provided with an adaptor to engage an inflating valve of a tire. A switch unit is mounted in the adaptor for connecting electrically the battery unit and the signal generating unit, and includes a resilient disc member with a peripheral portion secured to an inner wall of the adaptor, and a central portion moving in accordance with pressure inside the tire. An annular conductive piece is disposed on an inward protrusion of the adaptor and is connected to the signal generating unit. A conductive tubular body is disposed on the central portion of the disc member and extends slidably through the inward protrusion of the adaptor. The tubular body has a peripheral flange projecting outwardly from an upper end thereof and extending above the conductive piece. A hollow conductive seat member is mounted in the adaptor above the tubular body. The seat member is connected to the battery unit. An adjustment rod has external threads engaging internal threads of the seat member. A spring is clamped between the adjustment rod and the tubular body to bias the tubular body toward the disc member. The adjustment rod is movable within the seat member to adjust biasing force of the spring.

16 Claims, 3 Drawing Sheets

TIRE PRESSURE DETECTOR

BACKGROUND OF THE INVENTION

1. Field of the Invention

This invention relates to a pressure detector, more particularly to a tire pressure detector which is installed on an inflating valve of a tire for signaling a driver when the tire is deflated to a pressure below a predetermined proper pressure.

2. Description of the Related Art

The improvement of this invention is directed to a conventional tire pressure detector which has been disclosed in U.S. Pat. No. 4,814,745.

The conventional tire pressure detector is shown in FIGS. 1 and 2 to include a plastic hollow adaptor 11 which has a lower end formed with an internally threaded portion 111 for engaging an inflating valve of a tire, and an upper end engaging threadably and tightly an open lower portion of a cap-like casing 2. The lower end of the adaptor 11 is provided with a central finger piece for actuating the inflating valve. An electric alarming unit includes a sound producing circuit 12 and batteries 13 which are mounted within the casing 2 and which are connected electrically to each other. A resilient disc member 14 has a peripheral flange clamped by a hollow screw member 16 against an inner wall of the adaptor 11. The screw member 16 is made of a conductive metal and engages an internal thread of the adaptor 11 so as to position firmly the disc member 14 within the adaptor 11. The disc member 14 has a projection 141 projecting upwardly therefrom. A conductive coil spring 17 is provided to contact the batteries 13. The coil spring 17 is then connected to a conductive plate 15 to urge the conductive plate 15 to contact the screw member 16. The screw member 16 is then connected electrically to the sound producing circuit 12 by means of a wire 161.

When the adaptor 11 is mounted on the inflating valve of an inflated tire, air from the tire can push the projection 141 of the disc member 14 upwardly to move the conductive plate 15 away from the screw member 16, as shown in FIG. 2, thereby disconnecting electrically the sound producing circuit 12 from the batteries 13. Oppositely, when the tire is deflated to a predetermined reduced pressure, biasing force of the conductive spring 17 can bias the conductive plate 15 to contact the screw member 16, as shown in FIG. 1, thereby connecting electrically the sound producing circuit 12 to the batteries 13. In this way, the sound producing circuit 12 can produce an alarming sound to signal a driver.

However, the conventional tire pressure detector still has several drawbacks:

1. In order to control precisely electrical contact between the conductive plate 15 and the screw member 16 when the tire is deflated to a predetermined reduced pressure, the conductive spring 17 has to be designed to have a desired biasing force to overcome the predetermined reduced pressure such that the conductive spring 17 has to be manufactured with relatively high precision. However, it is quite difficult to manufacture the conductive springs 17 which have identical proterties.

2. Without the use of a positioning mechanism, the conductive plate 15 easily moves away from its original position when a car installed with the conventional tire pressure detector travels at a relatively high speed or runs on a rough road. Thus, the conductive plate 15 can not contact electrically and precisely the screw member 16 at a required proper condition.

3. Because it is made of a plastic material, the adaptor 11 easily breaks down upon impact with another object, such as a pebble, when the car travels at a relatively high speed. In addition, the internally threaded portion 111 of the plastic adaptor 11 wears easily after long term use.

SUMMARY OF THE INVENTION

Therefore, the main objective of the present invention is to provide a tire pressure detector which has an adjusting mechanism mounted therein for adjusting the biasing force of a spring of the tire pressure detector so as to permit mass production of the springs at a lower precision requirement.

Another objective of the present invention is to provide a tire pressure detector which has a guiding mechanism mounted therein for ensuring electrical contact between two separate conductive parts when the tire is deflated even if the car is travelling at a relatively high speed drive or is running on a rough road.

A further objective of the present invention is to provide a tire pressure detector which has a metal reinforcing sleeve member sleeved around an adaptor of the tire pressure detector and a metal valve engaging member mounted within the adaptor for engaging the inflating valve.

According to this invention, a tire pressure detector includes a cap-like casing, a hollow adaptor, a detector assembly and a pressure-actuated switch unit. The cap-like casing has a closed upper portion and an open lower portion. The adaptor is made of an insulating material and has an upper end engaging the open lower portion f the casing, a lower end adapted to engage and open an inflating valve of a tire to permit flow of air from the tire into the adaptor, and an inward protrusion projecting from an inner wall of the adaptor. The detector assembly includes a battery unit and a signal generating unit which are mounted within the casing. The switch unit is mounted within the adaptor for connecting electrically the battery unit to the signal generating unit so as to activate the signal generating unit when pressure inside the tire is insufficient.

The switch unit includes a resilient disc member disposed in the lower end of the adaptor. The disc member has a peripheral portion secured to the inner wall of the adaptor and forms an air chamber in the lower end of the adaptor to be communicated with an interior of the tire, and a central portion moving in accordance with pressure inside the tire. An annular conductive piece is disposed on an upper surface of the inward protrusion-of the adaptor and is connected electrically to one of the battery unit and the signal generating unit. A first contact unit has a conductive tubular body which is disposed on the central portion of the disc member and which extends slidably through the inward protrusion of the adaptor. The tubular body has a peripheral flange which projects outwardly from an upper end thereof and which extends above the conductive piece. A second contact unit includes a hollow conductive seat member which is mounted within the adaptor above the tubular body and which has an internally threaded portion. The seat member is connected electrically to the other one of the battery unit and the signal generating unit. The second contact unit further includes an adjustment rod which has an externally threaded portion that engages the internally threaded portion of the seat member. A spring has one end abutting the adjustment rod and another end abutting the tubular body to bias the tubular body toward the disc member. The adjustment rod is movable within the seat member to adjust biasing force of the spring.

When pressure inside the tire is sufficient to overcome the biasing force of the spring, the disc member biases the tubular body such that the peripheral flange of the tubular body is spaced from the conductive piece to disconnect electrically the signal generating unit from the battery unit. When pressure inside the tire is insufficient to overcome the biasing force, the spring biases the tubular body such that the peripheral flange of the tubular body contacts the conductive piece to connect electrically the signal generating unit to the battery unit.

The tire pressure detector further includes a tubular guide member secured to the inward protrusion of the adaptor and sleeved around the tubular body for guiding movement of the tubular body, and a metal reinforcing sleeve member sleeved around the adaptor.

The lower end of the adaptor is provided with a metal valve engaging member which is mounted securely within the air chamber and which has an axially extending passage and an internally threaded portion for engaging the inflating valve, and a central finger piece which is disposed in the passage for actuating the inflating valve when the valve engaging member engages the inflating valve. The finger piece has an axially extending hole communicated with the passage to permit the flow of air from the tire into the adaptor.

Preferably, the detector assembly further includes an insulating covering which confines the battery unit therein and which has a top wall with a central hole formed therethrough. The signal generating unit is disposed on the top wall of the insulating covering. The battery unit is disposed on the seat member. A conductive spring interconnects the signal generating unit and the battery unit and extends through the central hole of the top wall of the insulating covering. The conductive spring pushes the battery unit toward the seat member for electrical contact therewith. A conductor assembly connects electrically the conductive piece to the signal generating unit. The conductor assembly includes a first conductive plate disposed on the conductive piece, a second conductive plate extending from the first conductive plate to a bottom side of the insulating covering, a third conductive plate positioned on the bottom side of the insulating covering and contacting electrically the second conductive plate, and a fourth conductive plate connecting electrically the third conductive plate to the signal generating unit.

In addition, the tire pressure detector further includes a sealing ring which is sleeved on the adaptor and which engages a bottom edge of the open lower portion of the cap-like casing.

BRIEF DESCRIPTION OF THE DRAWINGS

Other features and advantages of this present invention will become apparent in the following detailed description of a preferred embodiment of this invention, with reference to the accompanying drawings, in which.

DETAILED DESCRIPTION OF THE PREFERRED EMBODIMENT

Figure 2:
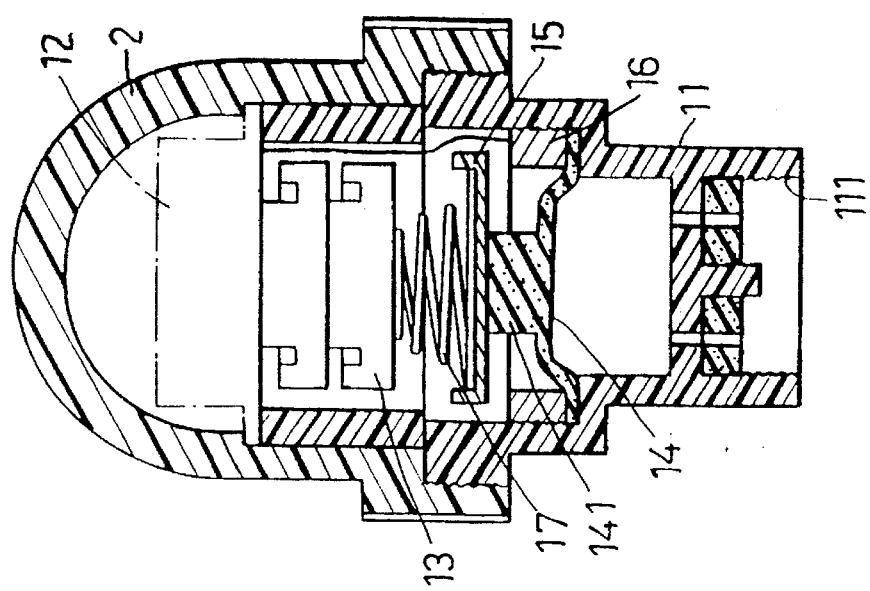
FIG. 2 is a sectional view illustrating the conventional tire pressure detector when in a normal state.
Figure 1:
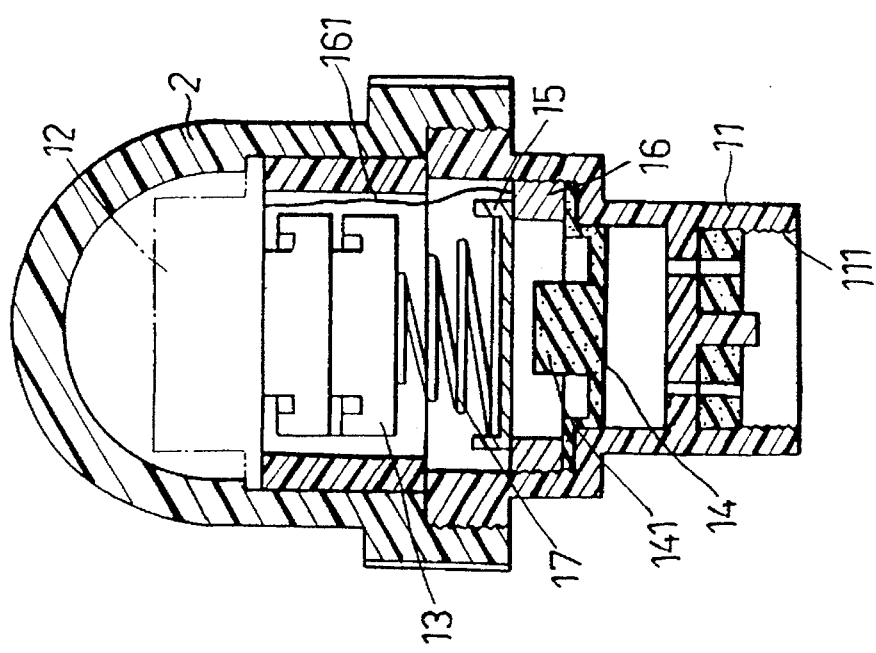
FIG. 1 is a sectional view illustrating a conventional tire pressure detector when the detector is in an actuated state.
Figure 3:
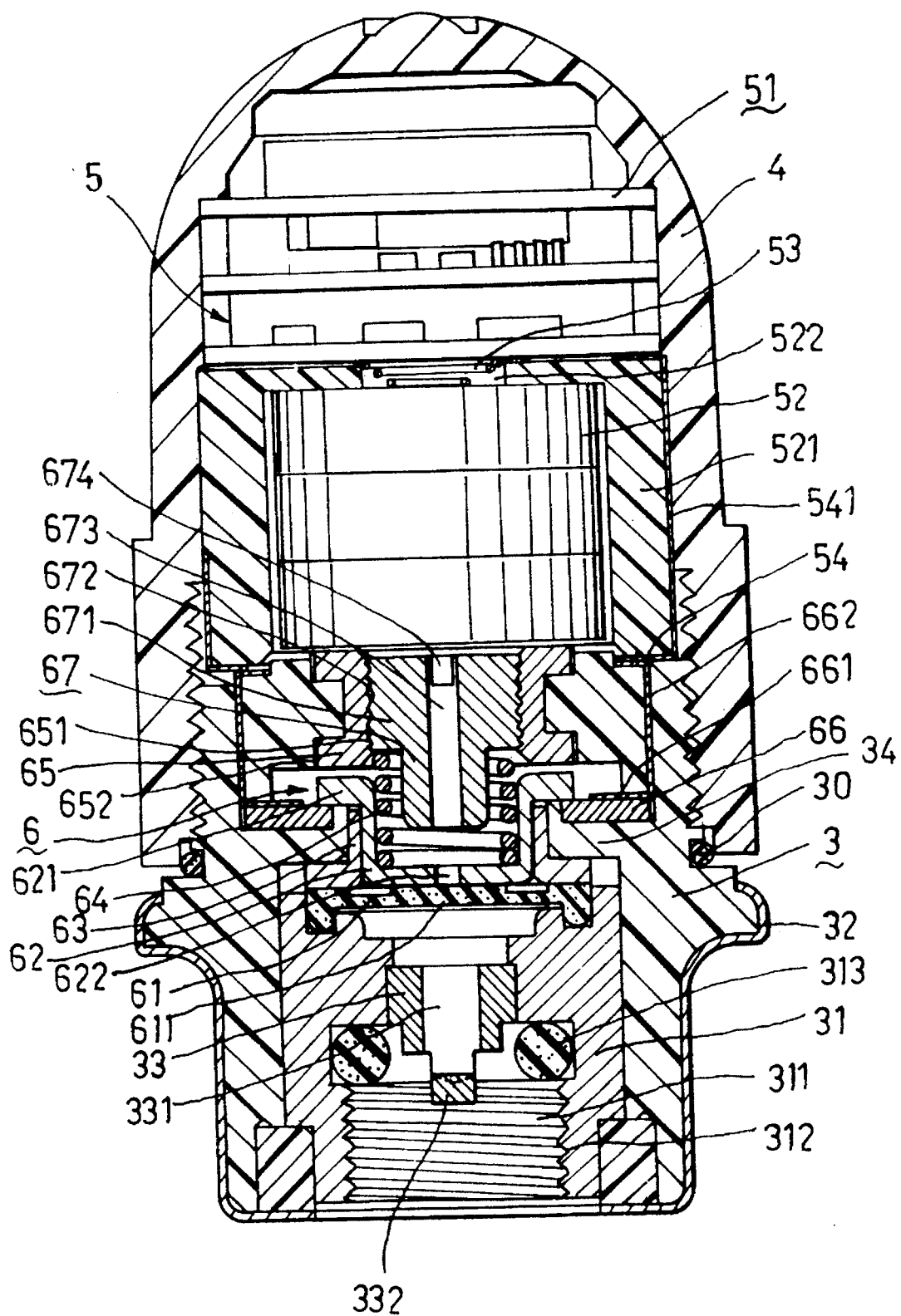
FIG. 3 is a sectional view illustrating a tire pressure detector of the preferred embodiment of this invention when the detector is in an actuated state.
Figure 4:
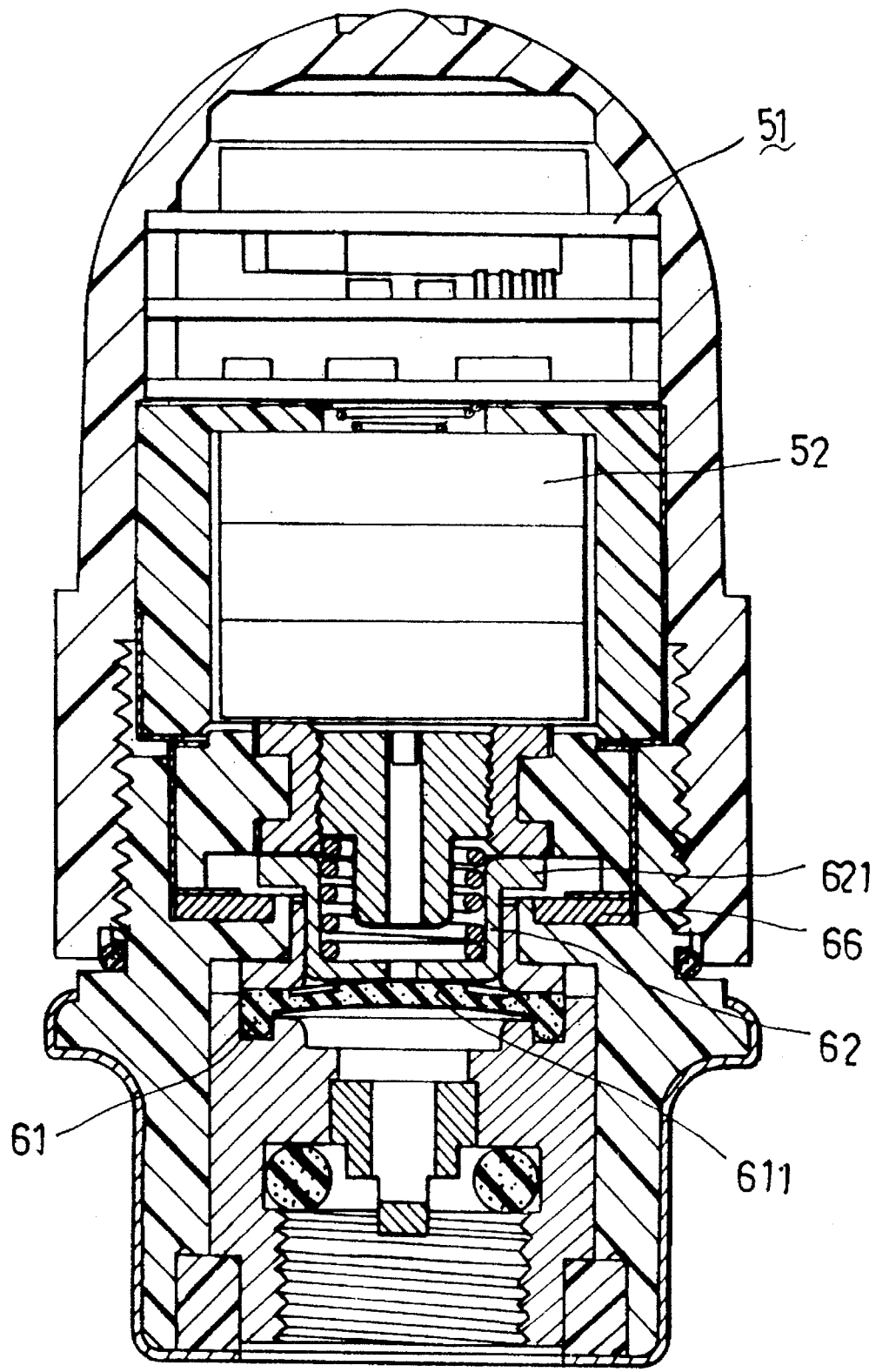
FIG. 4 is a sectional view illustrating the tire pressure detector when in a normal state in accordance with the preferred embodiment of this invention.

Referring to FIGS. 3 and 4, the preferred embodiment of a tire pressure detector according to this invention is installed on an inflating valve of a tire and includes a cap-like casing 4 and a hollow adaptor 3.

The cap-like casing 4 has a closed upper portion and an open lower portion formed with an internally threaded portion. The adaptor 3 is made of an insulating material and has an upper end formed with an externally threaded portion for engaging the internally threaded portion of the open lower portion of the casing 4, and a lower end adapted to engage and open the inflating valve to permit flow of air from the tire into the adaptor 3.

A sealing ring 30 is sleeved on the adaptor 3 and engages a bottom edge of the open lower portion of the cap-like casing 4 so as to provide sealing between the adaptor 3 and the casing 4. The lower end of the adaptor 3 is provided with a metal valve engaging member 31 which is mounted within an air chamber that is formed in the lower end of the adaptor 3. The metal valve engaging member 31 has a hexagonal cross-section, an axially extending passage 311 formed therethrough, an internally threaded portion 312 formed in a lower portion of an inner peripheral wall of the metal valve engaging member 31 for engaging the inflating valve of the tire, and a sealing ring 313 disposed within the axially extending passage 311 above the internally threaded portion 312 so as to provide sealing between the adaptor 3 and the inflating valve when the metal valve engaging member 31 engages the inflating valve. A metal reinforcing sleeve member 32 is sleeved around the adaptor 3. A central finger piece 33 is disposed within the axially extending passage 311 above the internally threaded portion 312. The central finger piece 33 has an axially extending hole 331 communicated with the axially extending passage 311, and an actuating lower portion 332 for actuating the inflating valve of the tire when the metal valve engaging member 31 engages the inflating valve, thereby permitting flow of air from the tire into the adaptor 3 via the axially extending passage 311 and the axially extending hole 331. An inward protrusion 34 projects from an inner wall of the adaptor 3 to separate the adaptor 3 into the upper and lower ends.

A detector assembly 5 includes a signal generating unit 51 which is conventional in construction and which is mounted within the casing 4 adjacent to the closed upper portion, and a battery unit 52 which consists of three cells connected in series and mounted within the casing 4 beneath the signal generating unit 51. An insulating covering 521 confines the battery unit 52 therein and has a top wall with a central hole 522 formed therethrough. The signal generating unit 51 is disposed on the top wall of the insulating covering 521. A conductive spring 53 interconnects negative terminals of the signal generating unit 51 and the battery unit 52 and extends through a central hole 522 of the top wall of the insulating covering 521. It should be noted that the negative terminal of the battery unit 52 can be made to contact directly the negative terminal of the signal generating unit 51 without the need for the conductive spring 53.

A pressure-actuated switch unit 6 is mounted within the adaptor 3 for electrically interconnecting positive terminals of the battery unit 52 and the signal generating unit 51 so as to activate the signal generating unit 51 when pressure inside the tire is insufficient.

The switch unit 6 includes a resilient disc member 61 disposed in the lower end of the adaptor 3. The disc member 61 has a peripheral portion secured to a top side of the metal valve engaging member 31 for covering a top opening of the axially extending passage 311 of the metal valve engaging member 31, thereby forming the air chamber in the lower end of the adaptor 3 to be communicated with an interior of the tire. The disc member 61 further has a central portion 611 moving in accordance with pressure inside the tire.

An annular conductive piece 66 is disposed on an upper surface of the inward protrusion 34 of the adaptor 3 and is connected electrically to the positive terminal of the signal generating unit 51 by means of a conductor assembly that will be described in greater detail in the following paragraph.

A first contact unit has a conductive tubular body 62 which is disposed on the central portion 611 of the disc member 61 for accommodating a spring 64 and which extends slidably through the inward protrusion 34 of the adaptor 3. Movement of the central portion 611 of the disc member 61 can cause corresponding movement of the conductive tubular body 62. The conductive tubular body 62 has a peripheral flange 621 which projects outwardly from an upper end thereof and which extends above the conductive piece 66. A hole 622 is formed through a central portion of a bottom wall of the conductive tubular body 62.

A tubular guide member 63 is secured to the inward protrusion 34 of the adaptor 3 in such a manner that an outwardly projecting lower flange of the guide member 63 is sandwiched between the bottom side of the inward protrusion 34 and the top side of the disc member 61. The guide member 63 can guide movement of the tubular body 62.

A second contact unit includes a hollow conductive seat member 65 which is mounted securely to the inner wall of the adaptor 3 above the conductive tubular body 62 in a known manner. The conductive seat member 65 has an internally threaded portion 651, and a tooth portion 652 formed on a side face of an outwardly projecting lower flange of the conductive seat member 65 and engaging with the inner wall of the adaptor 3 to avoid turning of the conductive seat member 65 relative to the inner wall of the adaptor 3. An outwardly projecting upper flange of the seat member 65 contacts directly the positive terminal of the battery unit 52. Note that the conductive spring 53 can bias the battery unit 52 toward the seat member 65 to ensure electrical contact therewith. The second contact unit further includes a conductive adjustment rod 67 which has a diameter-enlarged head portion 671 with an externally threaded portion 672 that engages the internally threaded portion 651 of the seat member 65. The spring 64 is made of a conductive material and has one end abutting the bottom wall of the tubular body 62 and another end abutting a bottom side of the head portion 671 of adjustment rod 67 so as to bias the tubular body 62 toward the disc member 61. Accordingly, the adjustment rod 67 can be moved within the seat member 65 to adjust biasing force of the spring 64. The adjustment rod 67 has an axially extending hole 673 formed therethrough. Thus, the exterior of the adaptor 3 above the disc member 61 can form an air chamber via the hole 622 of the tubular body 62 and the axially extending hole 673 of the adjustment rod 67 in order to prevent movement of the disc member 61 from being retarded due to air resistance formed within the interior of the adaptor 3 above the disc member 61. The adjustment rod 67 further has a notch 674 formed in a top surface thereof for facilitating mounting of the adjustment rod 67 in the seat member 65 by means of a screwdriver.

The conductor assembly includes an annular first conductive plate 661 disposed on the conductive piece 66, a pair of second conductive plates 662 extending from the first conductive plate 661 to a bottom side of the insulating covering 521, an annular third conductive plate 54 positioned on the bottom side of the insulating covering 521 and contacting electrically the second conductive plates 662, and a fourth conductive plate 541 connecting electrically the third conductive plate 54 to the positive terminal of the signal generating unit 51.

Accordingly, when pressure inside the tire is sufficient to overcome the biasing force of the spring 64, the central portion 611 of the disc member 61 moves upwardly, as shown in FIG. 4, by virtue of the tire pressure so as to move the tubular body 62 upwardly. As a result, the peripheral flange 621 of the tubular body 62 is spaced from the conductive piece 66 to disconnect electrically the signal generating unit 51 from the battery unit 52.

When the tire is deflated to a predetermined reduced pressure that is insufficient to overcome the biasing force of the spring 64, the central portion 611 of the disc member 61 moves downwardly, as shown in FIG. 3, by virtue of the biasing force of the spring 64. Thus, the peripheral flange 621 of the tubular body 62 contacts electrically the conductive piece 66. In this situation, the positive terminal of the battery unit 55 is connected electrically to the positive terminal of the signal generating unit 51 via the seat member 65, the adjustment rod 67, the spring 64, the tubular body 62, the conductive piece 66, the first conductive plate 661, the second conductive plates 662, the third conductive plate 54 and the fourth conductive plate 541. In this way, the signal generating unit 51 can be activated to signal a driver who is driving a car that is installed with the tire pressure detector of this present invention.

The advantages of the tire pressure detector of this invention are as follows:

1. By moving the adjustment rod 67 within the seat member 62 to adjust the biasing force of the spring 64, the tire pressure detector of this invention can be manufactured in larger quantities even though the springs mounted within the tire pressure detectors do not identical properties or were not manufactured with relatively high precision. Preferably, the tire pressure detectors of this invention can be fitted for tires with different operating tire pressures.

2. Because the guide member 63 can guide movement of the tubular body 62, the tubular body 62 does not move away from its original position when the car installed with the tire pressure detector travels at a relatively high speed or runs on a rough road. Thus, the peripheral flange 621 of the tubular body 62 can contact electrically and precisely the conductive piece 66 at a required proper condition.

3. Because it is surrounded by a metal reinforcing sleeve member 32, the adaptor 3 does not break down easily upon impact with another object, such as a pebble, when the car travels at a relatively high speed. In addition, the adaptor 3 is mounted to the inflating valve by means of the metal valve engaging member 31 which has an internally threaded portion 312 that does not wear down easily even after long term use. The service life of the tire pressure detector of this invention is thus longer than that of the aforementioned prior art.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangement.

I claim:

1. A pressure detector for a tire having an inflating valve, comprising:
   a cap-like casing having a closed upper portion and an open lower portion;
   a hollow adaptor made of an insulating material and having an upper end engaging said open lower portion of said casing, a lower end adapted to engage and open the inflating valve to permit flow of air from the tire into said adaptor, and an inward protrusion projecting from an inner wall of said adaptor;
   a detector assembly including a battery unit and a signal generating unit which are mounted within said casing;
   a pressure-actuated switch unit mounted within said adaptor for connecting electrically said battery unit to said signal generating unit so as to activate said signal generating unit when pressure inside the tire is insufficient, said switch unit including:
      a resilient disc member disposed in said lower end of said adaptor, said disc member having a peripheral portion secured to said inner wall of said adaptor and forming an air chamber in said lower end of said adaptor to be communicated with an interior of the tire, and a central portion moving in accordance with pressure inside the tire;
      an annular conductive piece disposed on an upper surface of said inward protrusion of said adaptor and connected electrically to one of said battery unit and said signal generating unit;
      a first contact unit having a conductive tubular body which is disposed on said central portion of said disc member and which extends slidably through said inward protrusion of said adaptor, said tubular body having a peripheral flange which projects outwardly from an upper end thereof and which extends above said conductive piece;
      a second contact unit including a hollow conductive seat member which is mounted within said adaptor above said tubular body and which has an internally threaded portion, said seat member being connected electrically to the other one of said battery unit and said signal generating unit, said second contact unit further including an adjustment rod which has an externally threaded portion that engages said internally threaded portion of said seat member; and
      a spring having one end abutting said adjustment rod and another end abutting said tubular body to bias said tubular body toward said disc member, said adjustment rod being movable within said seat member to adjust biasing force of said spring;
   whereby, when pressure inside the tire is sufficient to overcome said biasing force of said spring, said disc member biases said tubular body such that said peripheral flange of said tubular body is spaced from said conductive piece to disconnect electrically said signal generating unit from said battery unit, and when pressure inside the tire is insufficient to overcome said biasing force, said spring biases said tubular body such that said peripheral flange of said tubular body contacts said conductive piece to connect electrically said signal generating unit to said battery unit.

2. A pressure detector as claimed in claim 1, further comprising a tubular guide member secured to said inward protrusion of said adaptor and sleeved around said tubular body for guiding movement of said tubular body.

3. A pressure detector as claimed in claim 1, further comprising a metal reinforcing sleeve member sleeved around said adaptor.

4. A pressure detector as claimed in claim 1, wherein said lower end of said adaptor is provided with a metal valve engaging member which is mounted securely within said air chamber and which has an axially extending passage and an internally threaded portion for engaging the inflating valve, and a central finger piece which is disposed in said passage for actuating the inflating valve when said valve engaging member engages the inflating valve, said finger piece having an axially extending hole communicated with said passage to permit the flow of air from the tire into said adaptor.

5. A pressure detector as claimed in claim 1, wherein said detector assembly further includes an insulating covering confining said battery unit therein and having a top wall with a central hole formed therethrough, said signal generating unit being disposed on said top wall of said insulating covering, said battery unit being disposed on said seat member, said detector assembly further including a conductive spring which interconnects said signal generating unit and said battery unit and which extends through said central hole of said top wall of said insulating covering, said conductive spring pushing said battery unit toward said seat member for electrical contact therewith.

6. A pressure detector as claimed in claim 5, further comprising a conductor assembly which interconnects electrically said signal generating unit and said conductive piece, said conductor assembly including a first conductive plate disposed on said conductive piece, a second conductive plate extending from said first conductive plate to a bottom side of said insulating covering, a third conductive plate positioned on said bottom side of said insulating covering and contacting electrically said second conductive plate, and a fourth conductive plate connecting electrically said third conductive plate to said signal generating unit.

7. A pressure detector as claimed in claim 1, wherein said tubular body has a bottom wall with a hole formed through a central portion thereof, said adjustment rod having an axially extending hole formed therethrough.

8. A pressure detector as claimed in claim 1, further comprising a sealing ring sleeved on said adaptor and engaging a bottom edge of said open lower portion of said cap-like casing.

9. A pressure detector for a tire having an inflating valve, comprising:
   a cap-like casing having a closed upper portion and an open lower portion;
   a hollow adaptor made of an insulating material and having an upper end engaging said open lower portion of said casing, a lower end adapted to engage and open the inflating valve to permit flow of air from the tire into said adaptor, and an inward protrusion projecting from an inner wall of said adaptor;
   a detector assembly including a battery unit and a signal generating unit which are mounted within said casing;
   a pressure-actuated switch unit mounted within said adaptor for connecting electrically said battery unit to said signal generating unit so as to activate said signal generating unit when pressure inside the tire is insufficient, said switch unit including:
      a resilient disc member disposed in said lower end of said adaptor, said disc member having a peripheral portion secured to said inner wall of said adaptor and forming an air chamber in said lower end of said adaptor to be communicated with an interior of the tire, and a central portion moving in accordance with pressure inside the tire;
      an annular conductive piece disposed on an upper surface of said inward protrusion of said adaptor and connected electrically to one of said battery unit and said signal generating unit;

a first contact unit having a conductive tubular body which is disposed on said central portion of said disc member and which extends slidably through said inward protrusion of said adaptor, said tubular body having a peripheral flange which projects outwardly from an upper end thereof and which extends above said conductive piece;

a second contact unit mounted within said adaptor above said tubular body and connected electrically to the other one of said battery unit and said signal generating unit; and a spring having one end abutting said second contact unit, and another end abutting said tubular body to bias said tubular body toward said disc member;

whereby, when pressure inside the tire is sufficient to overcome biasing force of said spring, said disc member biases said tubular body such that said peripheral flange of said tubular body is spaced from said conductive piece to disconnect electrically said signal generating unit from said battery unit, and when pressure inside the tire is insufficient to overcome said biasing force, said spring biases said tubular body such that said peripheral flange of said tubular body contacts said conductive piece to connect electrically said signal generating unit to said battery unit.

10. A pressure detector as claimed in claim 9, further comprising a tubular guide member secured to said inward protrusion of said adaptor and sleeved around said tubular body for guiding movement of said tubular body.

11. A pressure detector as claimed in claim 9, wherein said second contact unit includes a hollow conductive seat member which is mounted within said adaptor above said tubular body and which has an internally threaded portion, said seat member being connected electrically to the other one of said battery unit and said signal generating unit, said second contact unit further including an adjustment rod which has an externally threaded portion that engages said internally threaded portion of said seat member, said adjustment rod abutting said one end of said spring and being movable within said seat member to adjust said biasing force of said spring.

12. A pressure detector as claimed in claim 9, further comprising a metal reinforcing sleeve member sleeved around said adaptor.

13. A pressure detector for a tire having an inflating valve, comprising:

a cap-like casing having a closed upper portion and an open lower portion;

a hollow adaptor made of an insulating material and having an upper end engaging said open lower portion of said casing, and a lower end adapted to engage and open the inflating valve to permit flow of air from the tire into said adaptor;

a detector assembly including a battery unit and a signal generating unit which are mounted within said casing;

a pressure-actuated switch unit mounted within said adaptor for connecting electrically said battery unit to said signal generating unit so as to activate said signal generating unit when pressure inside the tire is insufficient, said switch unit including:

a resilient disc member disposed in said lower end of said adaptor, said disc member having a peripheral portion secured to an inner wall of said adaptor and forming an air chamber in said lower end of said adaptor to be communicated with an interior of the tire, and a central portion moving in accordance with pressure inside the tire;

an annular conductive piece secured to said inner wall of said adaptor above said disc member and connected electrically to one of said battery unit and said signal generating unit;

a first contact unit disposed on said central portion of said disc member, and having a peripheral flange projecting therefrom and extending above said conductive piece;

a second contact unit including a hollow conductive seat member which is mounted within said adaptor above said first contact unit and which has an internally threaded portion, said seat member being connected electrically to the other one of said battery unit and said signal generating unit, said second contact unit further including an adjustment rod which has an externally threaded portion that engages said internally threaded portion of said seat member; and a spring having one end abutting said adjustment rod and another end abutting said first contact unit to bias said first contact unit toward said disc member, said adjustment rod being movable within said seat member to adjust biasing force of said spring;

whereby, when pressure inside the tire is sufficient to overcome said biasing force of said spring, said disc member biases said tubular body such that said peripheral flange of said first contact unit is spaced from said conductive piece to disconnect electrically said signal generating unit from said battery unit, and when pressure inside the tire is insufficient to overcome said biasing force, said spring biases said first contact unit such that said peripheral flange of said first contact unit contacts said conductive piece to connect electrically said signal generating unit to said battery unit.

14. A pressure detector as claimed in claim 13, wherein said adaptor has an inward protrusion projecting from said inner wall thereof for carrying said conductive piece thereon, said first contact unit having a conductive tubular body which is disposed on said central portion of said disc member and which extends slidably through said inward protrusion of said adaptor, said tubular body having an upper end provided with said peripheral flange which extends above said conductive piece.

15. A pressure detector as claimed in claim 14, further comprising a tubular guide member secured to said inward protrusion of said adaptor and sleeved around said tubular body for guiding movement of said tubular body.

16. A pressure detector as claimed in claim 13, further comprising a metal reinforcing sleeve member sleeved around said adaptor.

* * * * *